(12) United States Patent
Celani

(10) Patent No.: US 9,825,553 B2
(45) Date of Patent: Nov. 21, 2017

(54) VOLTAGE REGULATION IN RESONANT POWER WIRELESS RECEIVER

(71) Applicant: LINEAR TECHNOLOGY CORPORATION, Milpitas, CA (US)

(72) Inventor: Jonathan Wayde Celani, Hudson, NH (US)

(73) Assignee: Linear Technology Corporation, Milpitas, CA (US)

( * ) Notice: Subject to any disclaimer, the term of this patent is extended or adjusted under 35 U.S.C. 154(b) by 476 days.

(21) Appl. No.: 14/531,520

(22) Filed: Nov. 3, 2014

(65) Prior Publication Data

US 2015/0303824 A1 Oct. 22, 2015

Related U.S. Application Data

(60) Provisional application No. 61/980,891, filed on Apr. 17, 2014.

(51) Int. Cl.
| | | |
|---|---|---|
| *H02M 7/217* | (2006.01) | |
| *H02J 5/00* | (2016.01) | |
| *H02J 17/00* | (2006.01) | |
| *H02M 1/00* | (2006.01) | |

(52) U.S. Cl.
CPC ............. *H02M 7/217* (2013.01); *H02J 5/005* (2013.01); *H02J 17/00* (2013.01); *H02M 2001/0058* (2013.01); *Y02B 70/1441* (2013.01); *Y02B 70/1491* (2013.01)

(58) Field of Classification Search
CPC .................................................. H02M 7/217
USPC .......................................................... 307/104
See application file for complete search history.

(56) References Cited

U.S. PATENT DOCUMENTS

| | | | |
|---|---|---|---|
| 4,021,748 | A | 5/1977 | Yoshida et al. |
| 4,914,539 | A | 4/1990 | Turner et al. |
| 7,202,734 | B1 | 4/2007 | Raab |
| 2007/0232241 | A1 | 10/2007 | Carley et al. |
| 2013/0200717 | A1 | 8/2013 | Bourilkov et al. |

(Continued)

FOREIGN PATENT DOCUMENTS

| | | |
|---|---|---|
| CN | 1178407 A | 4/1998 |
| CN | 101789638 A | 7/2010 |

(Continued)

OTHER PUBLICATIONS

Taiwanese Office Action issued in Taiwanese Application No. 104110515, dated Aug. 25, 2016, with English Translation.

(Continued)

*Primary Examiner* — Joseph Chang
(74) *Attorney, Agent, or Firm* — McDermott Will & Emery LLP

(57) ABSTRACT

A control system is provided for controlling a power receiving circuit which is configured for receiving power wirelessly and producing an output voltage. The power receiving circuit has a resonant LC circuit including an inductive element and a capacitive element coupled in parallel. The control system includes a switching circuit coupled in parallel to the resonant LC circuit, and a feedback loop circuit configured for regulating the output voltage by controlling duration during which the switching circuit is in a conductive state in each cycle of a voltage developed across the resonant LC circuit.

18 Claims, 6 Drawing Sheets

(56) References Cited

U.S. PATENT DOCUMENTS

2013/0257167 A1   10/2013  Singh
2014/0042998 A1    2/2014  Saito et al.
2014/0077614 A1*  3/2014  Park .................. H02J 5/005
                                                              307/104

FOREIGN PATENT DOCUMENTS

| EP | 1717938 A1 | 11/2006 |
| --- | --- | --- |
| JP | 2004-201478 A | 7/2004 |
| TW | 201411981 A | 3/2014 |
| WO | WO-2013/103756 A1 | 7/2013 |
| WO | 2014/036449 A1 | 3/2014 |
| WO | WO 2014-036449 A1 | 3/2014 |
| WO | WO 2014-042681 A2 | 3/2014 |

OTHER PUBLICATIONS

ISA/KR (International Searching Authority/Korean Intellectual Property Office). 2015. International Search Report and Written Opinion of the International Searching Authority, dated May 29, 2015, for corresponding PCT Application No. PCT/US2015/021095, filed Mar. 17, 2015, entitled "Voltage Regulation in Resonant Power Wireless Receiver," Celani, Jonathan Wayde, inventor.
Extended European Search Report from European Patent Application No. 15779915.6, dated Sep. 15, 2017, 9 pages.

* cited by examiner

VOLTAGE AMPLIFIER NON-INVERTING INTEGRATION

TRANSCONDUCTANCE AMPLIFIER NON-INVERTING INTEGRATION

VOLTAGE REGULATION IN RESONANT POWER WIRELESS RECEIVER

RELATED APPLICATIONS

This application claims priority of U.S. provisional application No. 61/980,891, filed on Apr. 17, 2014, entitled "VOLTAGE REGULATION IN RESONANT POWER WIRELESS RECEIVER," and incorporated herewith by reference.

TECHNICAL FIELD

This disclosure relates to wireless power transmission, and in particular, to system and methodology for providing voltage regulation of a resonant wireless power receiver.

BACKGROUND ART

The field of wireless power transmission for low and medium power levels is currently focused on resonant technologies. A controlled-frequency circuit is used to generate an AC current through a magnetic coil at a specific frequency, which is used as an energy transmitter. The flux created in the transmission coil excites magnetics in a receiver circuit due to electromagnetic induction. A receiver is based on a tuned LC circuit, which resonates at the specific transmission frequency. This tuned LC circuit reacts to the current induced in the receiver coil, amplifying the resultant AC voltage due to resonance of the LC circuit. The AC voltage created across the LC circuit is then generally rectified, the resultant DC voltage being used by the remote electronics fed by the resonant wireless power receiver.

An appropriately designed receiver uses a high-quality factor (Q) LC circuit that is perfectly tuned to the transmission frequency, maximizing the voltage available to the receiver-fed electronics. As the tuned receiver LC circuit is operating at resonance, however, the resultant voltage could theoretically climb to astronomical levels, potentially damaging the electronics fed by the receiver. A method is therefore required to regulate the resultant receiver voltage to levels that are controlled and useable by the associated circuitry.

It is desirable to control the amplitude of a resonant receiver directly, resulting in a post-rectified DC voltage regulated to a level that is appropriate for an associated electronic system. Two methods of receiver amplitude control commonly discussed are (1) selective re-tuning of the LC circuit resonant frequency, or (2) Q reduction of the LC circuit. In the first case, the resonant frequency of the receiver circuit is shifted away from the transmission frequency, such that the gain characteristic is reduced at the transmission frequency such that the desired resultant voltage is achieved. In the second case, the tuned frequency remains the same, so the peak gain of the tuned receiver remains at the transmission frequency, but resistance is added to the resonant circuit reducing the Q of the circuit, and thus reducing the gain, such that the desired resultant voltage is achieved.

There are several problems with these two methods of resonant gain-adjustment, particularly when examining appropriateness for use in an automatic regulation system. Variation of resonant frequency, or re-tuning the circuit, is the most desirable regulation method since a high-Q LC circuit is extremely efficient, as it theoretically dissipates no power. Unfortunately, electronically controlled variable capacitors or electronically variable inductors are objects of fantasy, and thus the adjustment of resonant frequency characteristics of an LC circuit through dynamic variation of the effective inductance or capacitance is not a directly practical approach for regulation circuits. Q-reduction is a practical solution, as incorporation of electronically variable resistance is trivial, but Q-reduction through additional resistance necessarily means additional power dissipation, and the subsequent loss of efficiency quickly becomes problematic.

It would be desirable to develop system and methodology for providing voltage regulation of a wireless power receiver by re-tuning the effective gain characteristic of a resonant LC circuit without incorporation of additional passive components. Additionally, it would be desirable to control a wireless power receiver without direct introduction of resistive components so as to minimize resultant parasitic power dissipation.

SUMMARY OF THE DISCLOSURE

The present disclosure offers a control system for controlling a power receiving circuit which is configured for receiving power wirelessly and producing an output voltage. The power receiving circuit has a resonant LC circuit including an inductive element and a capacitive element coupled in parallel.

In accordance with one aspect of the disclosure, the control system comprises a switching circuit coupled in parallel to the resonant LC circuit, and a feedback loop circuit configured for regulating the output voltage by controlling duration during which the switching circuit is in a conductive state in each cycle of a voltage developed across the resonant LC circuit.

In an exemplary embodiment, the feedback loop circuit may include a pulse width modulation (PWM) control circuit responsive to an error signal representing a difference between the output voltage and a reference voltage, to produce a PWM control signal for controlling the switching circuit.

Also, the feedback loop circuit may include a zero crossing detect circuit configured for identifying a zero crossing of the voltage developed across the resonant LC circuit, to activate the PWM control circuit.

The zero cross detect circuit may operate in a single phase mode to identify a single zero crossing per sinusoid cycle of the voltage developed across the resonant LC circuit.

Alternatively, the zero cross detect circuit may operate in a dual phase mode to identify two zero crossings per sinusoid cycle of the voltage developed across the resonant LC circuit.

The feedback loop circuit may be configured for controlling the switching circuit in response to a rectified signal produced by a rectifier circuit responsive to the voltage developed across the resonant LC circuit.

The switching circuit may be implemented using a first N-type field effect transistor (NFET) and a second NFET. Drains of the first and second NFETs may be connected together, a source of the first NFET may be coupled to a first node of the resonant LC circuit, and a source of the second NFET may be coupled to a second node of the resonant circuit.

A first bootstrapped driver may be provided to control the first NFET. The first bootstrapped driver may include a first level shifter responsive to the PWM control signal for controlling a gate of the first NFET, and a first bootstrapped capacitor having a negative terminal coupled to the first node of the resonant LC circuit and a positive terminal coupled via a first diode to a DC voltage source.

A second bootstrapped driver configured for controlling the second NFET may include a second level shifter responsive to the PWM control signal for controlling a gate of the second NFET, and a second bootstrapped capacitor having a negative terminal coupled to the second node of the resonant LC circuit and a positive terminal coupled via a second diode to the DC voltage source.

The PWM control circuit may be implemented using a ramp generator responsive to a signal produced by the zero cross detect circuit. The PWM control circuit may further include a comparator for comparing the error signal with a ramp signal produced by the ramp generator. The PWM control circuit may be configured to control switching of the switching circuit based on an output signal of the comparator In accordance with a method of the present disclosure, the following steps are carried out for performing voltage regulation for the power receiving system:
coupling a shunt across the resonant LC circuit so as to allow current to pass around the resonant LC circuit when the shunt is in a low resistance state, and
in response to the output voltage of the power receiving circuit, controlling duration during which the shunt is in the low resistance state in each cycle of a voltage developed across the resonant LC circuit.

A control signal may be produced for controlling the shunt based on an error voltage representing a difference between the output voltage and an error signal. The control signal may be formed in response to the zero crossing of the voltage developed across the resonant LC circuit. For example, the shunt may be a switch controllable by a PWM control signal.

Additional advantages and aspects of the disclosure will become readily apparent to those skilled in the art from the following detailed description, wherein exemplary embodiments of the present disclosure are shown and described. As will be described, the disclosure is capable of other and different embodiments, and its several details are susceptible of modification in various obvious respects, all without departing from the spirit of the disclosure. Accordingly, the drawings and description are to be regarded as illustrative in nature, and not as limitative.

BRIEF DESCRIPTION OF THE DRAWINGS

The following detailed description of the embodiments of the present disclosure can best be understood when read in conjunction with the following drawings, in which the features are not necessarily drawn to scale but rather are drawn as to best illustrate the pertinent features, wherein.

DETAILED DISCLOSURE OF THE EMBODIMENTS

The present disclosure will be made using the specific examples presented below. However, the concept of the disclosure is applicable to various other modifications of the techniques discussed below.

The disclosed technique uses a controlled shunt device to interrupt the voltage characteristic of the resonant capacitance for a controlled time for each cycle of the resonant oscillation. This interruption of the voltage response of the capacitor for a given inductive current initial condition on a cycle-by-cycle basis reduces the circuit peak voltage for that given initial condition. By introducing this interruption of the cycle-by-cycle voltage characteristic, the resultant overall response to induced current is reduced, effectively simulating an increased capacitance in the resonant circuit. As such, the effective receiver resonance is shifted from the system transmit/receive frequency, reducing the voltage gain of the resonant LC receiver at that frequency. The duration of shunt activity per cycle, or degree of frequency-shift induced by the shunt device, can be easily controlled through a pulse-width-modulation (PWM) loop, thus making this approach especially conducive to implementation using an electronic feedback mechanism.

Figure 1:
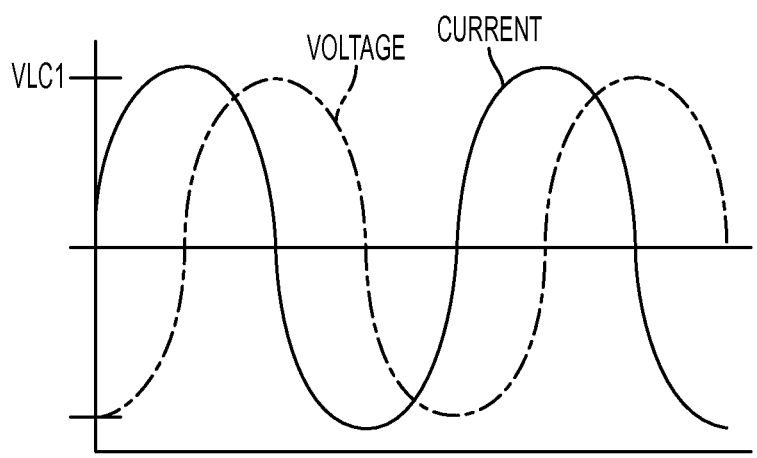
FIGS. 1 and 2 illustrate voltage and current responses of a resonant LC circuit.
Figure 2:
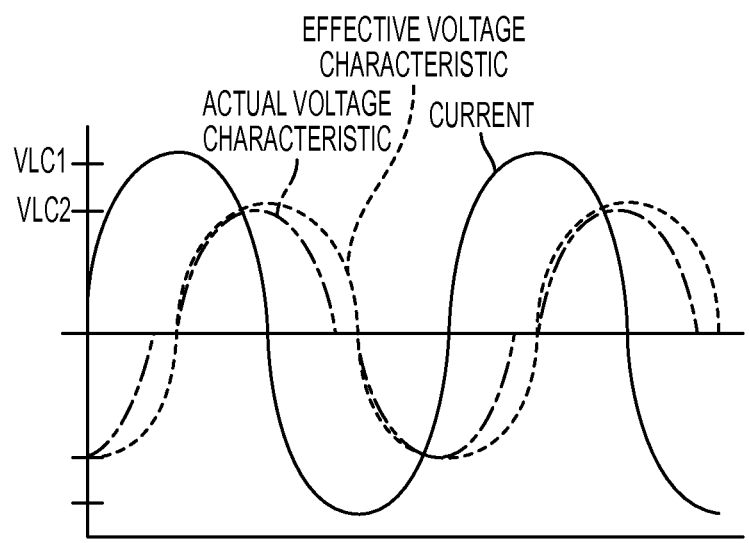

Referring to FIG. 1 showing voltage and current responses of a resonant LC circuit, at resonance. Where a voltage response lags a current response by 90 degrees. The induced voltage at resonance for a given current initial condition is proportional to 1/C, where C is a capacitance value of the LC circuit. As illustrated in FIG. 2, interrupting the voltage response of a resonant LC circuit for a given duration each cycle induces a reduced peak voltage characteristic analogous to that of increased capacitance. This corruption of the voltage characteristic reduces the peak voltage induced from VLC1 to VLC2, which is analogous to increasing the LC resonant circuit capacitance by a factor of VLC1/VLC2, reducing the effective resonant frequency from $\omega_0$ to $\omega_0*(VLC2/VLC1)^{1/2}$ for that given cycle.

Figure 3:
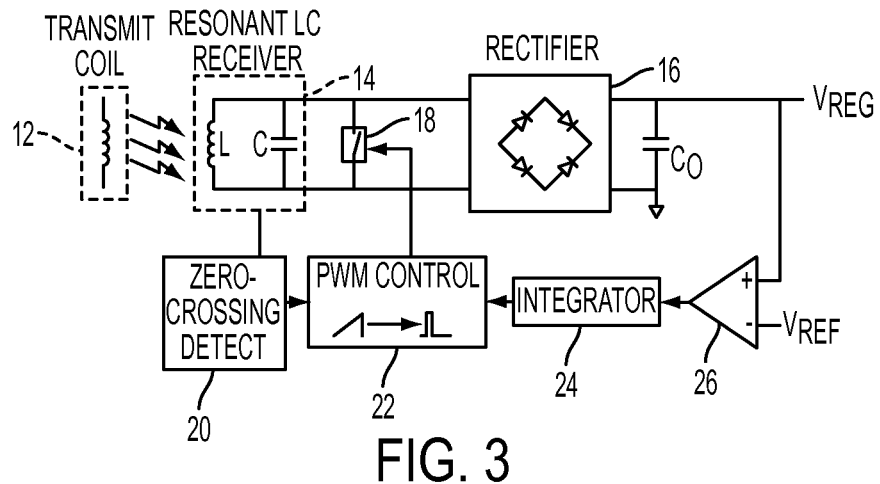
FIG. 3 shows an exemplary embodiment of a control system for controlling a resonant wireless receiver in accordance with the present disclosure.

FIG. 3 schematically shows an exemplary embodiment of a control system for controlling a resonant wireless receiver in a wireless communication system including a transmit magnetic coil 12 used as an energy transmitter. Due to electromagnetic induction, the magnetic flux created in the magnetic coil 12 excites magnetics in a resonant wireless power receiver 14 configured as a tuned LC resonant circuit including an inductive element L and a capacitive element C connected in parallel. The tuned LC circuit resonates at a frequency corresponding to the frequency of an AC current generated in the transmit magnetic coil 12.

Due to the resonance, the tuned LC circuit amplifies the AC voltage developed as a result of the current induced in the inductive element L. The waveform of the AC voltage developed across the LC circuit may have sinusoid cycles similar to sinusoid cycles of the voltage waveform shown in FIG. 1. The AC voltage developed across the resonant LC circuit is rectified by a rectifier 16 that produces a DC voltage $V_{REG}$ that may be supplied to the electronics fed by the wireless power receiver 14. An output capacitance Co may be coupled to the output of the rectifier 16.

The rectifier 16 may be configured as a full-bridge rectifier constructed, for example, with Schottky diodes. However, the voltage regulation technique of the present disclosure is equally effective when a half-bridge rectifier is used. Also, an active-bridge rectifier using controlled FETs can also be used for greater efficiencies.

As discussed above, the resultant voltage produced by the rectifier 16 could increase to levels potentially damaging the electronics fed by the receiver. A feedback loop is provided to control re-tuning of the LC resonant circuit so as to regulate the voltage $V_{REG}$ to a desirable level. In accordance with the present disclosure, the feedback loop controls switching of a shunt switch circuit 18 provided in parallel to the capacitive element C of the tuned LC resonant circuit.

The feedback loop controls the duration during which the shunt switch circuit 18 is in a conductive state in each cycle of the AC voltage developed across the resonant LC circuit. The beginning of each cycle may be identified by a zero crossing of this voltage.

In an exemplary embodiment, the feedback loop may include a zero crossing detect circuit 20, a pulse-width modulation (PWM) control circuit 22 that controls switching of the shunt switch circuit 18, an integrator 24 and an error amplifier 26. The shunt switch circuit 18 controlled by the PWM control circuit 22 must be initiated when there is no voltage across the shunt switch circuit 18 to maximize efficiency and minimize power dissipation in the switching elements. The zero-cross detect circuit 20 provides this information. The zero crossing detect circuit 20 coupled to one input of the PWM control circuit is configured to identify zero crossing of a voltage developed across the LC circuit and applied across the shunt switch circuit 18.

The other input of the PWM control circuit 22 may be driven by an integrated error signal produced by an error amplifier that compares the resultant rectified output voltage $V_{REG}$ with a desired reference voltage $V_{REF}$.

The LC resonant circuit is assumed to be adequately tuned to the transmit frequency to resonate, generating an increasing peak voltage waveform in response to stimulation via coupled flux generated by the transmit coil 12. As the peak voltage induced by the LC resonant circuit increases, the resultant rectified voltage $V_{REG}$ increases following the resonant circuit AC peak voltage.

When the rectified output voltage $V_{REG}$ increases to a level of the reference voltage $V_{REF}$, the error amplifier 26 produces an error signal integrated by the integrator 24 and supplied to the input of the PWM control circuit 22 which is initiated each cycle at the zero crossing of the voltage across the LC circuit detected by the zero crossing detect circuit 20. The PWM control circuit 22 turns the shunt switch 18 on for a portion of the oscillation cycle of the LC circuit, preventing a voltage response of the LC circuit to the existing resonating current until the shunt switch 18 is turned off. The shunt switch 18 is turned on at the LC circuit voltage zero crossing so as to prevent instantaneous voltage discharge of the capacitive element C in the LC circuit, a condition which could potentially generate high currents and increased power dissipation levels.

Figure 4:
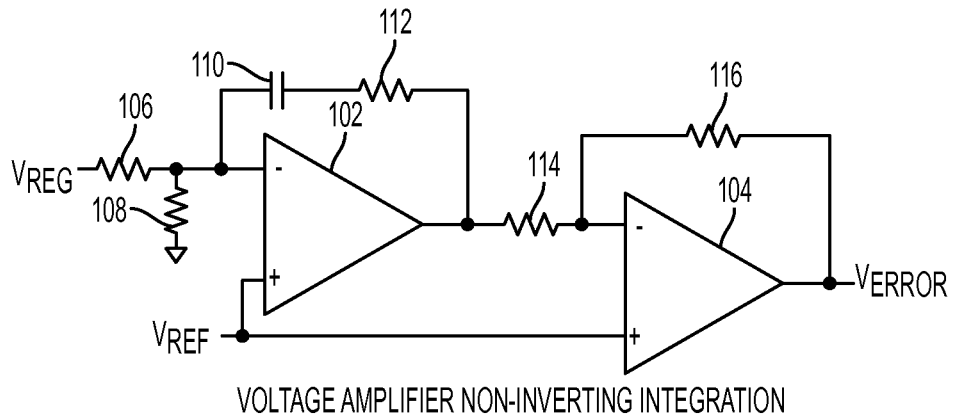
FIGS. 4-10 illustrate exemplary implementation of various elements presented in FIG. 3.

Exemplary implementation of various elements presented in FIG. 3 is discussed below. As shown in FIG. 4, a circuit combining the integrator 24 and the error amplifier 26 may be implemented by voltage amplifier with non-inverting integration. The voltage amplifier includes comparators 102 and 104. The voltage $V_{REG}$ is monitored using a resistor divider composed of resistors 106 and 108 coupled to the inverting input of the comparator 104. The reference voltage $V_{REF}$ is supplied to the non-inverting inputs of the comparators 102 and 104. An integrating circuit composed of a capacitor 110 and a resistor 112 is provided between the non-inverting input of the comparator 102 and its output. A resistor 114 may be coupled between the output of the comparator 102 and the inverting input of the comparator 104. A resistor 116 is coupled between the inverting input of the comparator 104 and its output to provide an active low-pass filter stage creating the error voltage $V_{ERROR}$ at the output of the comparator 104. The error voltage $V_{ERROR}$ representing an integrated difference between $V_{REG}$ and $V_{REF}$ is supplied to the PWM control circuit 22.

Figure 5:
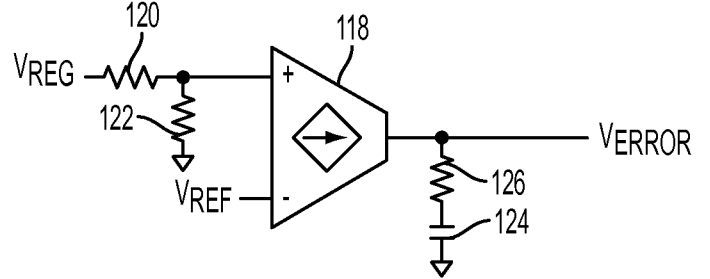

Alternatively, as shown in FIG. 5, a circuit combining the integrator 24 and the error amplifier 26 may be implemented by a transconductance amplifier 118 with non-inverting integration. The voltage $V_{REG}$ is monitored using a resistor divider composed of resistors 120 and 122 coupled to the non-inverting input of the transconductance amplifier 118. The reference voltage $V_{REF}$ is supplied to the inverting input of the transconductance amplifier 118 producing a current corresponding to a difference between $V_{REG}$ and $V_{REF}$. An integrating circuit composed of a capacitor 124 and a resistor 126 is provided between the output of the transconductance amplifier 118 and a ground node so as to produce an error voltage $V_{ERROR}$ representing an integrated difference between $V_{REG}$ and $V_{REF}$.

Figure 6:
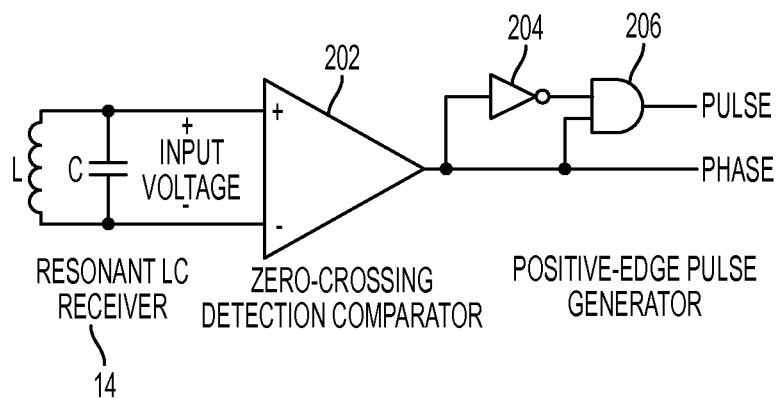
Figure 7:
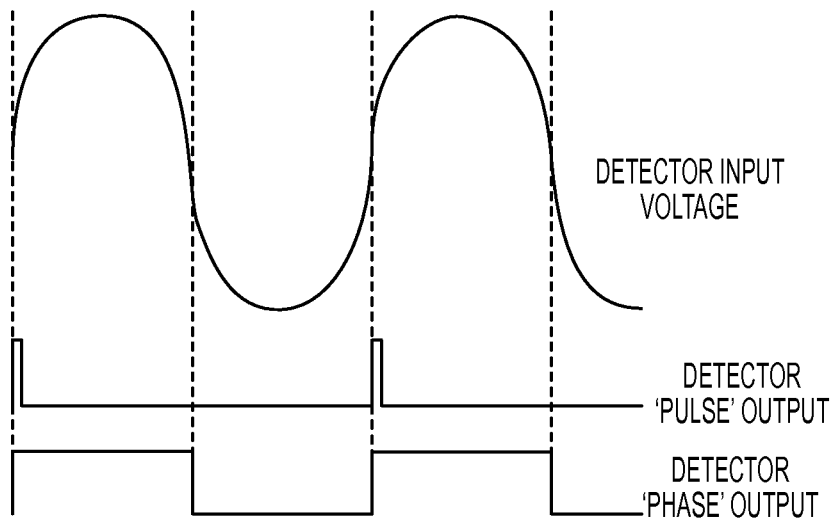

FIG. 6 illustrates an exemplary implementation of a zero cross detect circuit 20 which uses the voltage developed across the resonant LC circuit of the receiver 14 as an input voltage supplied to inverting and non-inverting inputs of a zero crossing detection comparator 202. This input voltage is illustrated in FIG. 7. Each of the comparator inputs is connected to one of the resonant LC circuit nodes. The voltage across the resonant LC circuit is a differential AC signal, typically sinusoidal in nature. The output of the comparator 202 is logic high when the differential voltage at the comparator inputs is positive and logic low when the input voltage is negative. Therefore, the output of the comparator 201 produces a digital pulse train with roughly a 50% duty-cycle that has the same frequency as the sinusoid-shape voltage created across the resonant LC receiver circuit. The output signal of the comparator 202 corresponds to the 'Phase' output signal of the zero cross detect circuit 20 illustrated in FIG. 7.

Further, the zero cross detect circuit 20 includes a positive-edge pulse generator composed of an inverter 204 coupled to the output of the comparator 202, and an AND gate 206 having one input coupled to the output of inverter 204 and another input coupled to the output of the comparator 202. The AND gate 206 outputs a short-duration pulse on the 'Pulse' output of the detect circuit 20 corresponding to the rising zero-crossing detection. As illustrated in FIG. 7, the 'Pulse' output signal is a digital pulse train with a very low duty-cycle, also having the same frequency as the sinusoid-shape voltage created across the resonant LC receiver circuit.

Particular implementations of the zero cross detect circuit 20 may detect the rising zero-crossing of the input voltage, falling zero-crossing of the input voltage, or both zero-crossings. Also, two zero-cross detectors with reversed input connections can be used. One of them may be configured for detecting the rising zero crossings, the other—for detecting the falling zero crossing.

Figure 8:
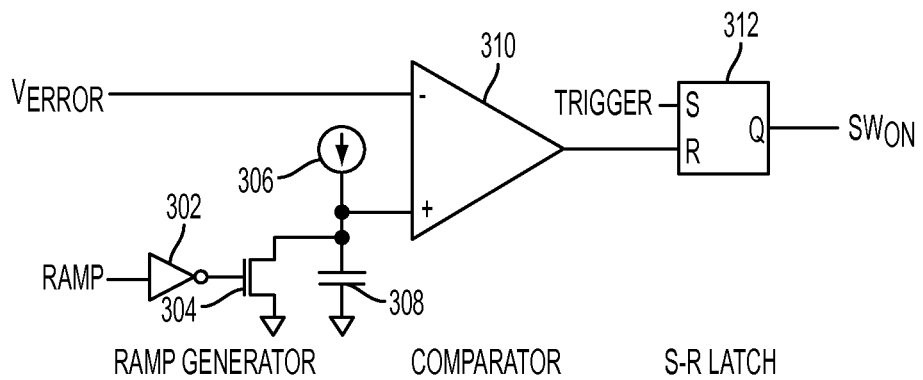

The 'Phase' and 'Pulse' output signals of the zero cross detect circuit 20 are supplied to the PWM control circuit 22, an exemplary implementation of which is shown in FIG. 8. The PWM control circuit 22 generates a pulse corresponding to the duration of time in each cycle during which the shunt switch circuit 18 remains in a conductive state. The PWM control circuit 22 in FIG. 8 comprises a ramp generator including an inverter 302 coupled to the gate of an N-type field effect transistor (NFET) 304, which is connected to a current source 306 and a capacitor 308. The input of inverter 302 is coupled to the 'Ramp' input of the PWM control circuit 22 supplied with the 'Phase' output signal of the zero cross detect circuit 20 illustrated in FIG. 9.

Figure 9:
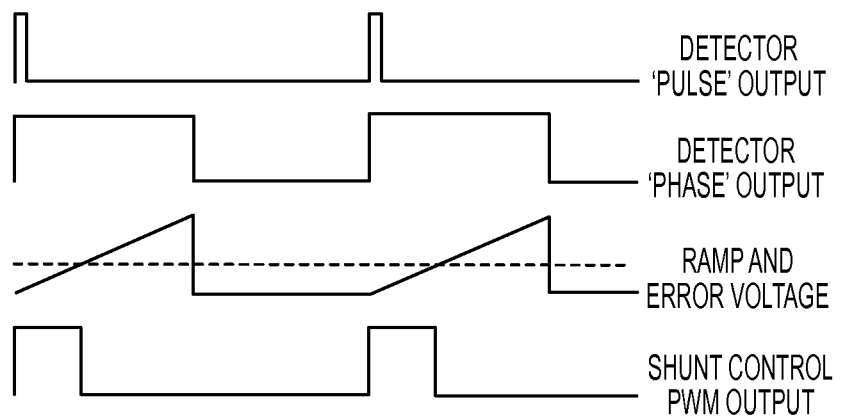

As illustrated in FIG. 9, the ramp voltage produced by the ramp generator is compared with the error voltage $V_{ERROR}$ produced at the output of the integrator 24. In particular, the ramp generator is controlled such that the ramp is enabled and applied to the non-inverting input of a voltage comparator 310 while the 'Ramp' input signal is logic high. The non-inverting input of the voltage comparator 310 is held low while the 'Ramp' input signal is logic low.

The output of the comparator 310 is coupled to the reset input R of a reset-dominant S-R latch 312. The set input S of the latch 312 is connected to the 'Trigger' input of the PWM control circuit 22 supplied with the 'Pulse' output signal of the zero cross detect circuit 20 illustrated in FIG. 9. The Q output of the latch 312 produces a shunt control PWM output signal $SW_{ON}$ illustrated in FIG. 9. The $SW_{ON}$ control signal is supplied to the shunt switch circuit 18 to control switching.

The PWM control circuit 22 is active while the 'Ramp' input is at logic high. The 'Trigger' signal is a short-duration pulse that is synchronous with the beginning of the 'Ramp' logic high pulse which is used to indicate the beginning of the PWM control circuit active period. The 'Trigger' signal is input to the S input of the latch 312 such that the Q output will become logic high if the error voltage $V_{ERROR}$ at the inverting input of the comparator 310 is below the ramp voltage at the non-inverting input. The Q output will remain logic high until the ramp voltage rises above the $V_{ERROR}$ voltage, at which point the Q output latches logic low.

Figure 10:
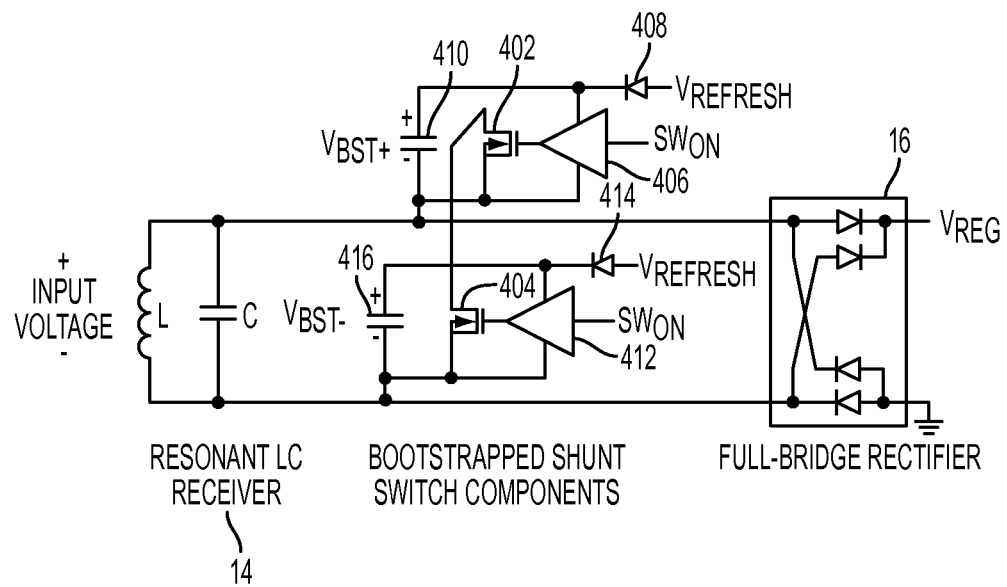

FIG. 10 shows an exemplary embodiment of the shunt switch circuit 18 coupled in parallel to the resonant LC circuit of the receiver 14. The differential AC voltage developed across the LC circuit may be converted to a DC voltage by a full-bridge rectifier 16, which references the lowest part of the voltage on each side of the LC circuit at ground. As such, the voltages on both sides of the LC circuit are sinusoidal and out of phase, operating between the peak amplitude and a value close to ground. The shunt switch circuit 18 that shorts the two sides of the LC circuit together thus must be able to withstand the peak voltage differentially, but does not have to sustain excursions below ground. Switching of the shunt switch circuit 18 may accomplished using first and second back-to-back NFETs 402 and 404 respectively controlled using first and second bootstrapped drivers referenced to the associated sides of the resonant LC circuit.

The first bootstrapped driver includes a level shifter 406, a diode 408 and a bootstrapped capacitor 410. The second bootstrapped driver includes a level shifter 412, a diode 414 and a bootstrapped capacitor 416. Each bootstrapped driver accepts a ground-referred logic level input $SW_{ON}$ supplied by the PWM control circuit 22. This input is level-shifted by the level shifters 406 and 412 to gate-drive outputs supplied to the gate of the respective NFETs 402 and 404. Each gate drive output operates within a local floating supply voltage $V_{BST}$. The local supply voltages $V_{BST}$ are generated on the bootstrapped capacitors 410 and 416, each of which is referenced to the associated side of the resonant LC circuit. Charges on the capacitors 410 and 116 are replenished through the respective diodes 408 and 414 using the $V_{REFRESH}$ voltage provided by a local DC power supply. For example, a 5V voltage may be provided from the local DC power supply.

The zero-crossing detect circuit 20 and the PWM control circuit 22 discussed above operate on a single phase of the voltage across the LC circuit. That is, only one zero-crossing per sinusoid cycle of the LC circuit voltage is detected. Therefore, the shunt switch circuit 18 is activated for a single pulse during each cycle of the voltage sinusoid, and the switch control pulse train has the same frequency as the LC circuit voltage waveform. However, the control system of the present disclosure may be implemented using two phases of the LC circuit voltage, i.e. by detecting each zero-crossing in the sinusoid cycle. A dual phase control may be implemented using either identical control channels with reversed input connections, or by using dedicated dual phase control circuits. Both single and dual phase implementations exhibit similar general control characteristics, but the dual phase implementation is desired as it has a far greater control range by virtue of its ability to approach 100% duty cycle.

Figure 11:
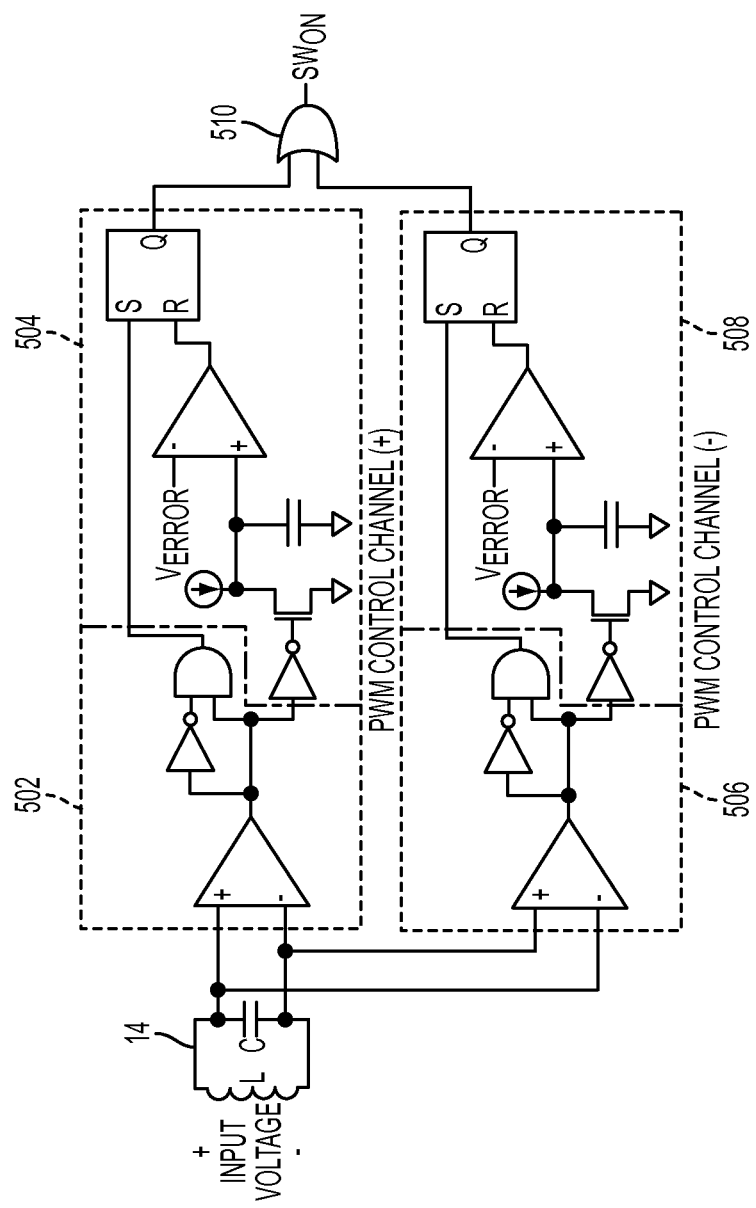
FIG. 11 illustrates an exemplary two-channel implementation of a dual phase control system of the present disclosure.

FIG. 11 illustrates an exemplary two-channel implementation of a dual phase control system of the present disclosure. Two control channels are coupled to the resonant LC circuit of the receiver 14 to detect two zero crossings in each cycle of the voltage across the LC circuit. The first control channel includes a zero crossing detect circuit 502 and a PWM control circuit 504. The second control channel includes a zero crossing detect circuit 506 and a PWM control circuit 508. Each of the zero crossing detect circuits 502 and 506 may be configured in a manner similar to the zero crossing detect circuit in FIG. 6. Each of the PWM control circuits 504 and 508 may be configured similar to the PWM control circuit in FIG. 8. Output signals of the PWM control circuits 504 and 508 are supplied to an OR gate 510 to produce a shunt control PWM signal $SW_{ON}$ so as to place the shunt switch circuit 18 in a conductive state in response to both zero crossing in each sinusoid cycle of the voltage across the LC circuit.

The foregoing description illustrates and describes aspects of the present invention. Additionally, the disclosure shows and describes only preferred embodiments, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art.

The embodiments described hereinabove are further intended to explain best modes known of practicing the invention and to enable others skilled in the art to utilize the invention in such, or other, embodiments and with the various modifications required by the particular application or uses of the invention. Accordingly, the description is not intended to limit the invention to the form disclosed herein.

What is claimed is:

1. A control system for controlling a power receiving circuit configured for receiving power wirelessly, producing an output voltage and having a resonant LC circuit including an inductive element and a capacitive element coupled in parallel, the control system comprising:
    a controllable shunt circuit coupled in parallel to the resonant LC circuit that, when activated, shunts substantially all current generated by the resonant LC circuit, and
    a feedback loop circuit configured for regulating the output voltage by activating the controllable shunt circuit during only a portion of each cycle of a voltage developed across the resonant LC circuit so as to cause the output voltage to be at a pre-determined level, the feedback loop circuit comprising a pulse width modulation (PWM) control circuit that produces a PWM control signal responsive to a difference between the output voltage and a reference voltage, to control the controllable shunt circuit.

2. The system of claim 1, wherein the feedback loop circuit further includes a zero crossing detect circuit configured for identifying a zero crossing of the voltage developed across the resonant LC circuit, to activate the PWM control circuit.

3. The system of claim 2, wherein the zero crossing detect circuit is configured to operate in a single phase mode to identify a single zero crossing per sinusoid cycle of the voltage developed across the resonant LC circuit.

4. The system of claim 2, wherein the zero crossing detect circuit is configured to operate in a dual phase mode to identify two zero crossings per sinusoid cycle of the voltage developed across the resonant LC circuit.

5. The system of claim 2, wherein the PWM control circuit includes a ramp generator responsive to an error signal produced by the zero crossing detect circuit.

6. The system of claim 5, wherein the PWM control circuit further includes a comparator for comparing the error signal with a ramp signal produced by the ramp generator.

7. The system of claim 6, wherein the PWM control circuit is configured to control switching of the controllable shunt circuit based on an output signal of the comparator.

8. The system of claim 1, wherein the feedback loop circuit is configured for controlling the controllable shunt circuit in response to a rectified signal produced by a rectifier circuit responsive to the voltage developed across the resonant LC circuit.

9. The system of claim 1, wherein the controllable shunt circuit includes a first N-type field effect transistor (NFET) and a second NFET, drains of the first and second NFETs are connected together, a source of the first NFET is coupled to a first node of the resonant LC circuit, and a source of the second NFET is coupled to a second node of the resonant LC circuit.

10. The system of claim 9 further comprising a first bootstrapped driver configured for controlling the first NFET and including a first level shifter responsive to the PWM control signal for controlling a gate of the first NFET, and a first bootstrapped capacitor having a negative terminal coupled to the first node of the resonant LC circuit and a positive terminal coupled via a first diode to a DC voltage source.

11. The system of claim 10 further comprising a second bootstrapped driver configured for controlling the second NFET and including a second level shifter responsive to the PWM control signal for controlling a gate of the second NFET, and a second bootstrapped capacitor having a negative terminal coupled to the second node of the resonant LC circuit and a positive terminal coupled via a second diode to the DC voltage source.

12. The system of claim 1, wherein the controllable shunt circuit is a switch controllable by a control signal.

13. The system of claim 12, wherein the control signal is a PWM signal.

14. A method of voltage regulation for a power receiving system configured for receiving power wirelessly and producing an output voltage, the power receiving system having a resonant LC circuit including an inductive element and a capacitive element coupled in parallel, the method comprising the steps of:
coupling a controllable shunt across the resonant LC circuit that, when in an active state, shunts substantially all of the current generated by the resonant LC circuit, and
in response to the output voltage of the power receiving circuit, producing a pulse width modulation (PWM) control signal and controlling, based on the PWM control signal, the duration during which the controllable shunt is active during only a portion of each cycle of a voltage developed across the resonant LC circuit, so as to cause the output voltage to be at a predetermined level, wherein the PWM control signal is responsive to a difference between the output voltage and a reference voltage.

15. The method of claim 13 further including a step of producing a control signal for controlling the controllable shunt based on an error voltage representing a difference between the output voltage and an error signal.

16. The method of claim 14 further including a step of identifying a zero crossing of the voltage developed across the resonant LC circuit.

17. The method of claim 15, wherein the control signal is produced in response to the zero crossing.

18. A system for receiving power wirelessly to produce an output voltage, comprising:
a resonant LC circuit including an inductive element and a capacitive element coupled in parallel,
a rectifier for rectifying a voltage developed across the resonant LC circuit to produce the output voltage,
a controllable shunt circuit coupled in parallel to the resonant LC circuit that, when activated, shunts substantially all current generated by the resonant LC circuit, and
a control circuit configured for actuating the controllable shunt circuit to regulate the output voltage during only a portion of each cycle of a voltage developed across the resonant LC circuit, the control circuit producing a pulse width modulation control signal responsive to a difference between the output voltage and a reference voltage, to control the controllable shunt circuit.

* * * * *